United States Patent
Suleman et al.

(10) Patent No.: US 12,072,877 B2
(45) Date of Patent: *Aug. 27, 2024

(54) METHOD AND SYSTEM OF CLASSIFICATION IN A NATURAL LANGUAGE USER INTERFACE

(71) Applicant: Microsoft Technology Licensing, LLC, Redmond, WA (US)

(72) Inventors: Kaheer Suleman, Waterloo (CA); Joshua R. Pantony, Waterloo (CA); Wilson Hsu, Waterloo (CA); Zhiyuan Wu, Waterloo (CA); Phil Tregenza, Waterloo (CA); Sam Pasupalak, Waterloo (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,641

(22) Filed: May 13, 2019

(65) Prior Publication Data

US 2019/0272269 A1    Sep. 5, 2019

Related U.S. Application Data

(63) Continuation of application No. 14/233,640, filed as application No. PCT/CA2012/000685 on Jul. 19, 2012, now Pat. No. 10,387,410.

(Continued)

(30) Foreign Application Priority Data

Jul. 19, 2011   (CA) ................................ CA 2747153

(51) Int. Cl.
*G06F 16/245* (2019.01)
*G06F 16/28* (2019.01)
(Continued)

(52) U.S. Cl.
CPC .......... *G06F 16/245* (2019.01); *G06F 16/285* (2019.01); *G06F 40/216* (2020.01);
(Continued)

(58) Field of Classification Search
None
See application file for complete search history.

(56) References Cited

U.S. PATENT DOCUMENTS 6,665,666 B1 * 12/2003 Brown ................ G06F 16/3338
707/999.005
6,785,651 B1 * 8/2004 Wang ...................... G06F 9/453
379/88.01

(Continued)

OTHER PUBLICATIONS

Asif Ekbal, Sriparna Saha; Weighted Vote-Based Classifier Ensemble for Named Entity Recognition: A Genetic Algorithm-Based Approach; Jun. 2011; URL: https://dl.acm.org/doi/10.1145/1967293.1967296 (Year: 2011).*

*Primary Examiner* — Richa Sonifrank (57) ABSTRACT

A method and system are provided for processing natural language user queries for commanding a user interface to perform functions. Individual user queries are classified in accordance with the types of functions and a plurality of user queries may be related to define a particular command. To assist with classification, a query type for each user query is determined where the query type is one of a functional query requesting a particular new command to perform a particular type of function, an entity query relating to an entity associated with the particular new command having the particular type of function and a clarification query responding to a clarification question posed to clarify a prior user query having the particular type of function. Functional queries may be processed using a plurality of natural lan- (Continued)

guage processing techniques and scores from each technique combined to determine which type of function is commanded.

18 Claims, 9 Drawing Sheets

Related U.S. Application Data (60) Provisional application No. 61/596,407, filed on Feb. 8, 2012.

(51) Int. Cl.
    *G06F 40/216*     (2020.01)
    *G06F 40/284*     (2020.01)
    *G06F 40/295*     (2020.01)
    *G06F 40/35*     (2020.01)
    *G06F 40/56*     (2020.01)
    *G10L 15/18*     (2013.01)
    *G10L 15/22*     (2006.01)
    *G06F 3/16*     (2006.01)
    *G06Q 30/0601*     (2023.01)

(52) U.S. Cl.
    CPC .......... *G06F 40/284* (2020.01); *G06F 40/295* (2020.01); *G06F 40/35* (2020.01); *G06F 40/56* (2020.01); *G10L 15/1822* (2013.01); *G10L 15/22* (2013.01); *G06F 3/16* (2013.01); *G06F 3/167* (2013.01); *G06Q 30/0601* (2013.01)

(56) References Cited

U.S. PATENT DOCUMENTS

| | | | | |
|---|---|---|---|---|
| 7,036,128 | B1* | 4/2006 | Julia ..................... | G06N 5/043 707/E17.139 |
| 8,204,751 | B1* | 6/2012 | Di Fabbrizio .......... | G10L 15/22 704/277 |
| 8,219,407 | B1* | 7/2012 | Roy ........................ | G10L 15/16 704/275 |
| 2003/0216923 | A1* | 11/2003 | Gilmore ................ | G10L 13/027 704/270.1 |
| 2004/0148170 | A1* | 7/2004 | Acero ................... | G06F 40/216 704/257 |
| 2005/0165607 | A1* | 7/2005 | Di Fabbrizio .......... | G06F 40/30 704/E15.04 |
| 2009/0077047 | A1* | 3/2009 | Cooper .................. | G06F 40/30 |
| 2009/0112605 | A1* | 4/2009 | Gupta ................ | G01C 21/3608 704/E21.001 |
| 2009/0259651 | A1* | 10/2009 | Tankovich ............ | G06F 40/194 707/999.005 |
| 2011/0093271 | A1* | 4/2011 | Bernard .................. | G06F 16/40 704/257 |
| 2011/0295593 | A1* | 12/2011 | Raghuveer ............. | G06Q 10/10 704/9 |
| 2012/0254143 | A1* | 10/2012 | Varma .................... | G06F 40/30 707/706 |

\* cited by examiner

Fig. 2

- Cloudfront Server 106
- Event Notification Service 110
- Delegate Service 108
- Speech Service 112
- NLP Service 114
- Conversation Service 116
- External Dependent Services 118
- Template Service 202
- Persistence: Memcache Service RDBMS 204
- Application Server and Business Code Components (e.g. JBoss Server and Enterprise Java Bean (EJB) Service Container) 206

METHOD AND SYSTEM OF CLASSIFICATION IN A NATURAL LANGUAGE USER INTERFACE

CROSS-REFERENCE TO RELATED APPLICATIONS

This application is a continuation application of U.S. patent application Ser. No. 14/233,640, entitled "METHOD AND SYSTEM OF CLASSIFICATION IN A NATURAL LANGUAGE USER INTERFACE," filed on Sep. 18, 2014, which application is a National Stage Application of PCT/CA2012/000685, filed Jul. 19, 2012, which claims priority to and the benefit of U.S. Provisional Patent Application Serial No. 61/596,407, filed Feb. 8, 2012, the entire disclosures of which are hereby incorporated herein by reference.

TECHNICAL FIELD

The present disclosure relates to natural language processing in a speech-based user interface and more particularly to classifying speech inputs.

BACKGROUND

User interfaces for electronic and other devices are evolving to include speech-based inputs in a natural language such as English. A user may voice a command to control the operation of a device such as a smartphone, appliance, robot or other device. Natural language processing, a type of machine learning using statistics, may be used to interpret and act upon speech inputs. Speech recognition may convert the input to text. The text may be analyzed for meaning to determine the command to be performed.

Speech inputs in a natural language for a command may be ambiguous and require clarification. More than one speech input may be occasioned to complete a specific command. Thus, sequential speech inputs may relate to a same command or to different commands.

SUMMARY

Classifying a speech input in relation to a current command or a new command may be useful to processing the command.

A method and system are provided for processing natural language user queries for commanding a user interface to perform functions. Individual user queries are classified in accordance with the types of functions and a plurality of user queries may be related to define a particular command. To assist with classification, a query type for each user query is determined where the query type is one of a functional query requesting a particular new command to perform a particular type of function, an entity query relating to an entity associated with the particular new command having the particular type of function and a clarification query responding to a clarification question posed to clarify a prior user query having the particular type of function. Functional queries may be processed using a plurality of natural language processing techniques and scores from each technique combined to determine which type of function is commanded.

In one example aspect, there is provided a computer-implemented method of processing user queries comprising natural language for a natural language-based user interface for performing one or more functions. The method comprises: receiving at a computing device a plurality of user queries for defining one or more commands for controlling the user interface to perform particular types of functions; and classifying, via the computing device, individual user queries in accordance with the types of functions to relate a subset of the plurality of user queries to define a particular command for invoking a particular type of function, determining a query type for each user query, the query type selected from a group comprising a functional query, an entity query and a clarification query; wherein the functional query comprises a request for a particular new command to perform a particular type of function; the entity query relates to an entity associated with the particular new command having the particular type of function; and the clarification query is responsive to a clarification question posed to clarify a prior user query having the particular type of function.

The computer-implemented method may further comprise further processing the user queries in response to the particular type of function to define the particular command. The computer-implemented method may further comprise providing the particular command to invoke the function.

Classifying may comprise, for a user query received following a posing of a clarification question: performing keyword analysis on the user query to determine whether the user query is responsive to the clarification question; and classifying the user query as a clarification query having the particular type of function in response to the keyword analysis. Keyword analysis may be performed in accordance with term frequency-inverse document frequency (TF-IDF) techniques to identify keywords in the user query which are associated with the clarification question posed.

The computer-implemented method may comprise, for a user query received following a posing of a clarification question which is unresponsive to the question posed or for a user query received other than a user query received following a posing of a clarification question: determining whether the user query is an entity query or a functional query and in response, perform one of: classifying the user query as an entity query having the particular type of function of the particular command to which it relates; and classifying the user query as a functional query, analyzing the user query to determine the particular type of function for the particular new command. Determining whether the user query is an entity query or a functional query may be performed using a support vector machine.

Analyzing the user query to determine the particular type of function may comprise: performing a plurality of natural language processing techniques to determine a rank of candidate types of functions and selecting the type of function in response. The natural language processing techniques may include one or more of random forest processing, naïve Bayes classifier processing, a plurality of support vector machines processing, and previous query score processing. The rank may be derived from the plurality of natural language processing techniques via a two layer neural network responsive to an output of each of the plurality of natural language processing techniques. Previous query score processing may comprise: performing statistical analysis to provide candidate types of functions for the user query, the analysis responsive to keywords of the user query and prior user queries having associated respective types of functions previously determined for each of the prior user queries. The computer-implemented method may comprise maintaining a data store of prior user queries and respective types of functions. The prior user queries may be responsive to individual users to provide user-centric preferences for commands.

The computer-implemented method may comprise posing a clarification question in response to a previous user query, the clarification question associated with a type of function.

Processing the user queries in response to the particular type of function may comprise extracting entities from the user queries for the particular command using statistical modeling methods. A genetic algorithm may be used to define optimized features sets with which to extract the entities for particular types of functions. The statistical modeling methods may comprise using conditional random fields.

The user queries may comprise voice signals and the method may further comprise converting the voice signals to text.

In one example aspect, there is provided a system comprising one or more processors and memory storing instructions and data for performing a method in accordance with an aspect described. In one example aspect, there is provided a computer program product comprising a storage medium (e.g. a memory or other storage device) storing instructions and data for performing a method in accordance with an aspect described.

BRIEF DESCRIPTION OF FIGURES

Like reference numerals indicate like parts throughout the diagrams.

DETAILED DESCRIPTION

Figure 1:
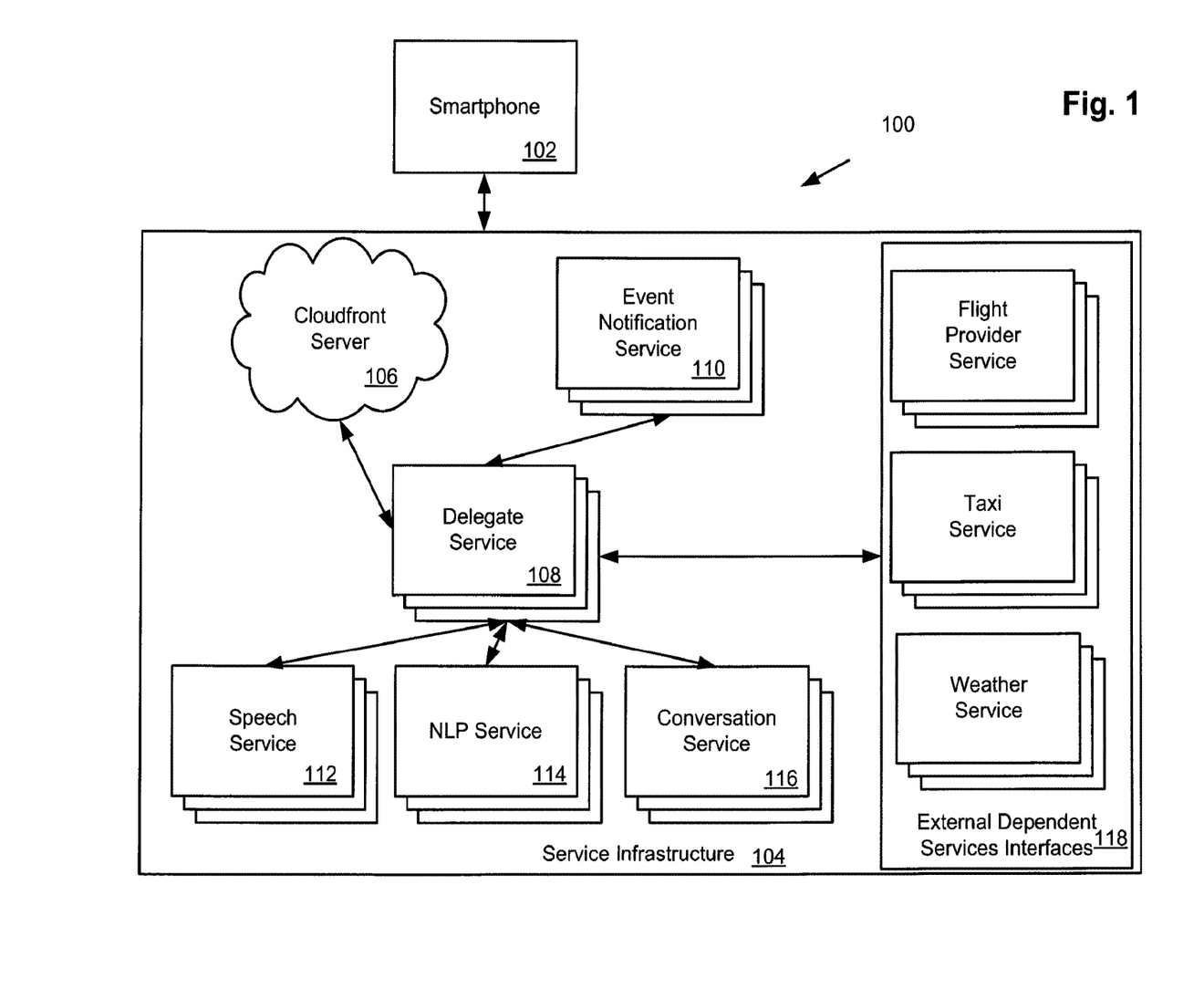
FIG. 1 is a block diagram of a top level architecture of a communication system including a smartphone and a cloud-based service in accordance with one example embodiment.
Figure 2:
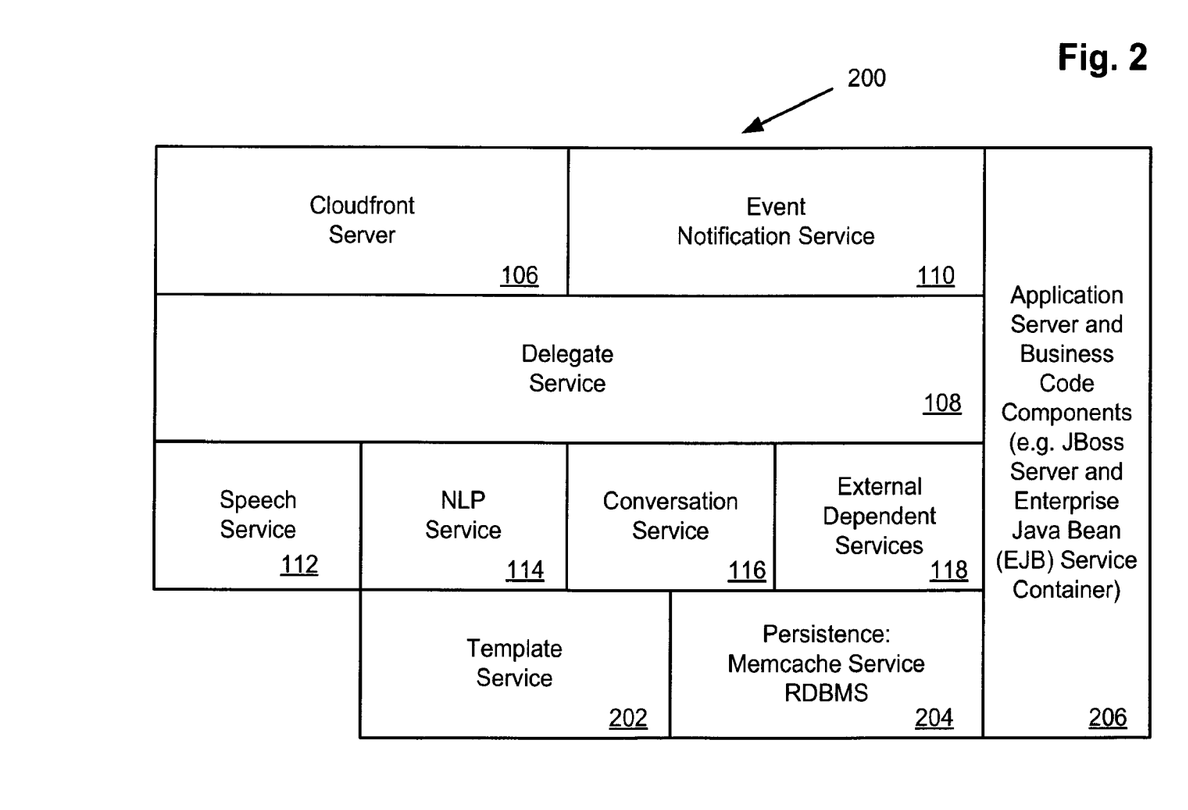
FIG. 2 is a block diagram that shows software architecture of the cloud-based service in accordance with one embodiment.

FIG. 1 is a block diagram of a top level architecture, in accordance with one example embodiment, of a communication system 100 including a smartphone 102 and components of a cloud-based service infrastructure 104 providing a voice-based interface to one or more services. FIG. 2 is a block diagram that shows software architecture of the cloud-based service infrastructure 104 in accordance with one embodiment. In the present example embodiment, cloud-based service infrastructure 104 is configured to permit a user of smartphone 102 to provide speech inputs defining commands to obtain one or more services.

A command may comprise an action and associated parameters or other data. For example, a command such as "I want to book a meeting" indicates a calendar related action but does not include associate parameters such as date, time, location, invitees etc. A command "I want to fly to San Francisco next Tuesday" indicates a travel related action and provides some associated parameters such as destination and travel date.

Services in this context may be internal services or external services. Internal services relate to one or more functions of the user's communication device (e.g. smartphone 102) such as voice and data communication services, personal information management (PIM) by way of example, telephone, email, Instant Messaging (IM), text or short message service (SMS), calendar, contacts, notes, and other services. External services relate to those provided by another party, typically via a web connection, such as a travel booking service, weather information service, taxi service, shopping service, information retrieval service, social networking service, etc.

In some contexts, the user input may be a speech input, but responses (output) from the service for presenting by smartphone 102 need not be speech (e.g. synthesized automated voice) responses. Output may include text or other types of response (e.g. image, sounds, etc). In addition to speech inputs, a user may also provide other inputs via the smartphone 102. For example, a speech input such as "Send an email to Bob" defining a command to email a particular contact may initiate a draft email on smartphone 102. The user may manually edit the email using a keyboard (not shown) or other input means of smartphone 102.

With reference to FIGS. 1 and 2, components of cloud-based service infrastructure 104 include cloudfront server 106, delegate service 108, event notification service 110, speech service 112, NLP service 114, conversation service 116, external dependent service interfaces 118 providing access to one or more external services such as flight provider service 118A, taxi service 118B and weather service 118C. It is apparent that there may be a plurality of each of these respective service components within the infrastructure to scalably and reliably handle service request from a plurality of communication devices of which only one is illustrated. Though shown as a client (smartphone) and server model, certain functions and features may be performed on the client.

Cloudfront server 106 provides connection, load balancing and other communication related services to a plurality of communication devices such as smartphone 102. Delegate service 108 is chiefly responsible for handling and/or coordinating processing of the speech input, the resulting commands for the applicable services and any applicable responses.

Event notification service 110 provides event-related messages to smartphone 102, for example, data communications such as calendar reminders, recommendation, previously used external services, follow-ups, survey requests, etc.

Speech service 112 performs speech-to-text conversion, receiving speech input for defining a command, such as in the form of an digital audio recording, from smartphone 102 and provides text output. In examples discussed herein with reference to FIGS. 3-7, such text output is a user query 302.

NLP service 114 analyzes the user query to determine meaning and specific commands with which to provide the services. Conversation service 116 assists with the user interface between the user and the services, for example, engaging in natural language dialogue with the user. The dialogue may include questions clarifying one or more aspects of a specific command as discussed further herein below. The service's responses to speech inputs from smartphone 102 need not be in a spoken word format but may be in a text-based or other format as previously mentioned.

Interfaces 118 are interfaces to particular web-based services (e.g. Web Services) or other external services. External services typically utilize well-defined interfaces for receiving requests and returning responses. Cloud-based service infrastructure 104 provides a manner for receiving natural language commands for such services, determining the applicable external service request and any associated data (parameters) to make the request and invoking the request. Cloud-based service infrastructure 104 is also configured to receive the applicable response and provide same to smartphone 102. Similar operations may be performed to invoke internal services.

Internal services such as via interfaces 118 can be invoked a number of ways. Any service call mechanism can be used. Examples are but not limited to REST, SOAP, CORBA etc. Non-service call, passive mechanisms can also be used. In this case, data is placed at digital location that is accessible by the invoked service. The invoked service checks this digital location. This passive mechanism is also effective as an invocation mechanism For simplicity, components appearing in FIG. 2 that also appear in FIG. 1 are identically numbered. Software components 200 further include template service 202 to assist with the conversation service 116, persistence memcache service/relational database management service (RDBMS) 204 for storing and managing data and application server and business code components 206 such as components of an object oriented JBoss Server and Enterprise Java Beans® (EJB) container service in accordance with an example implementation.

Smartphone 102 is configured, such as via one or more applications, to send language information to cloud-based service infrastructure 104 and receive a response based on language understanding. Smartphone 102 is also configured to receive notifications from event notification service 110. In some embodiments, smartphone 102 may be configured perform language understanding without the use of cloud-based service infrastructure 104, for example, when understanding requires sensitive information or information unique to the phone (e.g. contact information entities). In some embodiments, (not shown) user devices need not be limited to smartphones only. Other communication devices can be supported such as dumb phones via any communication protocol including TTY and SMS. Non-phone clients, like laptops, set top boxes, TV's and kiosks, etc. can be supported as well.

Figure 3:
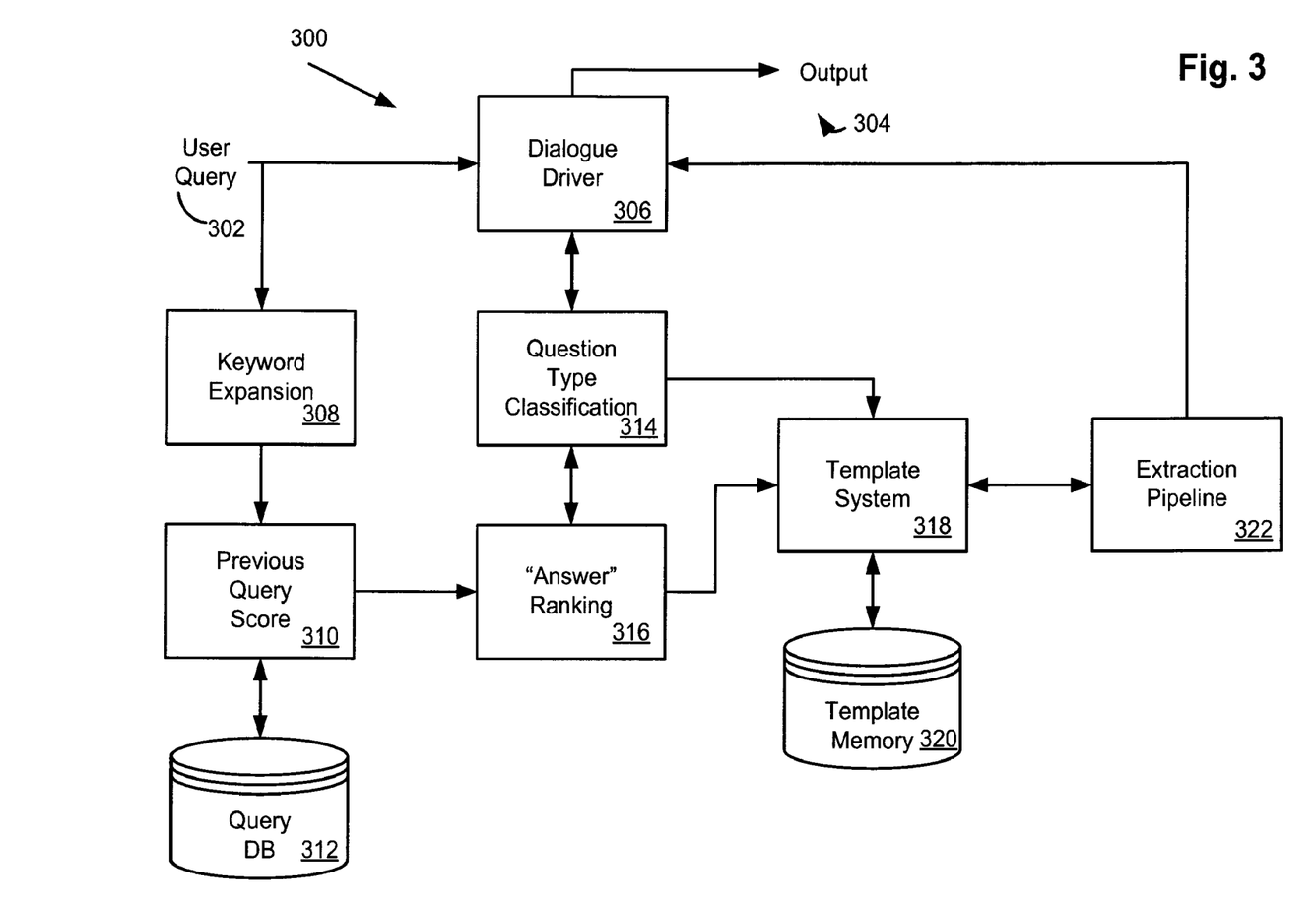
FIG. 3 illustrates a block diagram of modules performing operations (methods) of the service of FIGS. 1 and 2.

FIG. 3 illustrates a general overview flow of selected operations (methods) 300 of the service of FIGS. 1 and 2. A user query 302 is input to such operations 300 and provides output 304 discussed further herein below.

Dialogue driver 306 receives user query 302 for processing, providing same to question type classification determiner 314. User query 302 is also provided to keyword expansion unit 308. The user query and expanded keywords (not shown) are provided to previous query score determiner 310 which references prior queries (not shown) stored to query database 312. Previous query score determiner 310 performs statistical analysis and provides candidate answers (commands) for ranking by answer ranking unit 316.

Figure 6:
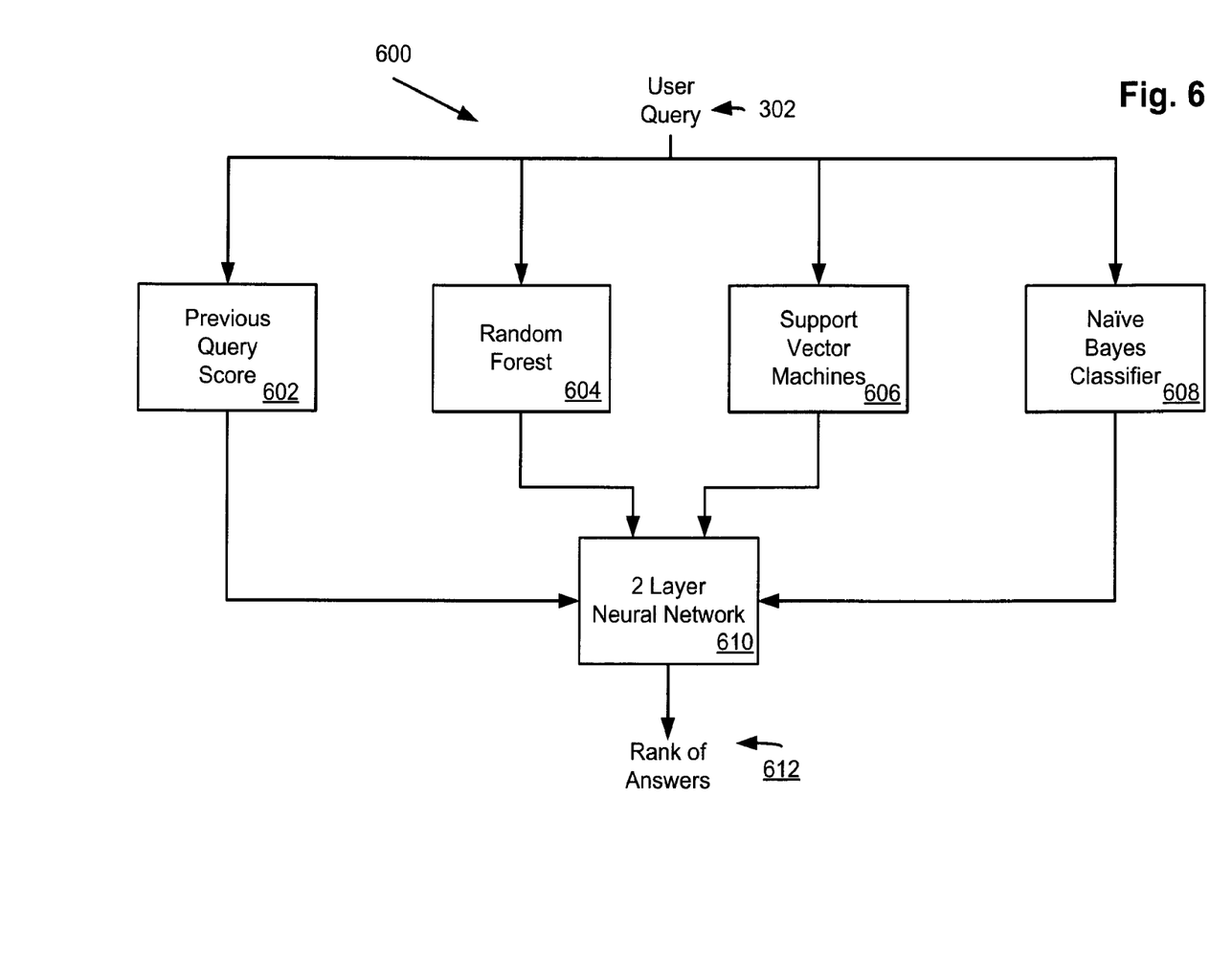
FIG. 6 illustrates a block diagram of modules performing operations (methods) of answer ranking.

Previous query score determiner 310 may be useful in determining that a particular user query likely relates to a particular command as well as determining that a particular user query likely does not relate to a particular command. Previous query score 602 may be used as an input to 2 layer neural network 610 as shown in FIG. 6 (as well as to other methods for combining statistical classifiers such as a reciprocal rank fusion method). Previous query score 602 may also be employed in post-processing of the rank of answers 612 generated by 2 layer neural network 610 to eliminate some candidate answers and/or to select some candidate answers as the command likely intended by the user. In some embodiments, previous query score 602 is used only in post-processing of the rank of answers 612 instead of as an input to 2 layer neural network 612.

Query database 312 may store, such as in a machine learning manner, a history of user queries and the associated commands and additional data such as keywords determined by cloud-based service infrastructure 104. The query database 312 may store a complete history (or subset) of a particular user's queries and associated commands to build user-centric preferences. For example a particular user's user query "Tell Bob I want a meeting" may result in a command to telephone Bob or email Bob. The resulting command to telephone or email, as applicable, may be associated with the user query "tell" on behalf of the particular user.

In addition to providing a source of user-centric preferences, query database 312 may also be useful to store and provide access to user queries, commands etc. from all users, such as via an aggregated subset of queries and associated commands. The aggregated data may define a broader corpus from which statistics and other data may be gleaned and be useful when determining expanded keywords and/or the classification of a user query.

Question type classification determiner 314 evaluates user query 302 to determine whether it is a function type query, entity type query, or a clarification type query. A function type query establishes a new command. An example of a function type query is "Book a meeting for next Friday at 2:00 pm" or "Send a message to Bob".

A entity type query is in relation to a current command and adds or changes an entity in such command. For example, "Actually, move that to 3:00 pm" or "Add James to the message".

A clarification type query is in relation to a current command and is responsive to a clarification question (output 304) posed by dialogue driver 306. Clarification type queries only occur when the dialogue driver asks the user a clarification style question: e.g. For a user query "Tell Bob I want a meeting", an output 304 comprising a clarification question from dialogue driver 306 may be "Did you want to text or email Bob?".

Function type queries are directed by question type classification determiner 314 to answer ranking unit 316 for determining the new command, if possible. Question type classification determiner 314 directs entity type queries and clarification type queries to template system 318 for additional processing to obtain further meaning from the user query with a view to also initiating appropriate output. Template system 318 may also receive function type queries from answer ranking unit 316. Template system 318 may access template memory store 320 to define or refine a command and to define applicable output 304.

Extraction pipeline 322 receives the user query and conversation features and extracts entities from the user query to build up the command and its associated data as described further herein below with reference to FIG. 7.

Dialogue driver 306 provides output 304 for smartphone 102 also as described below.

Figure 4:
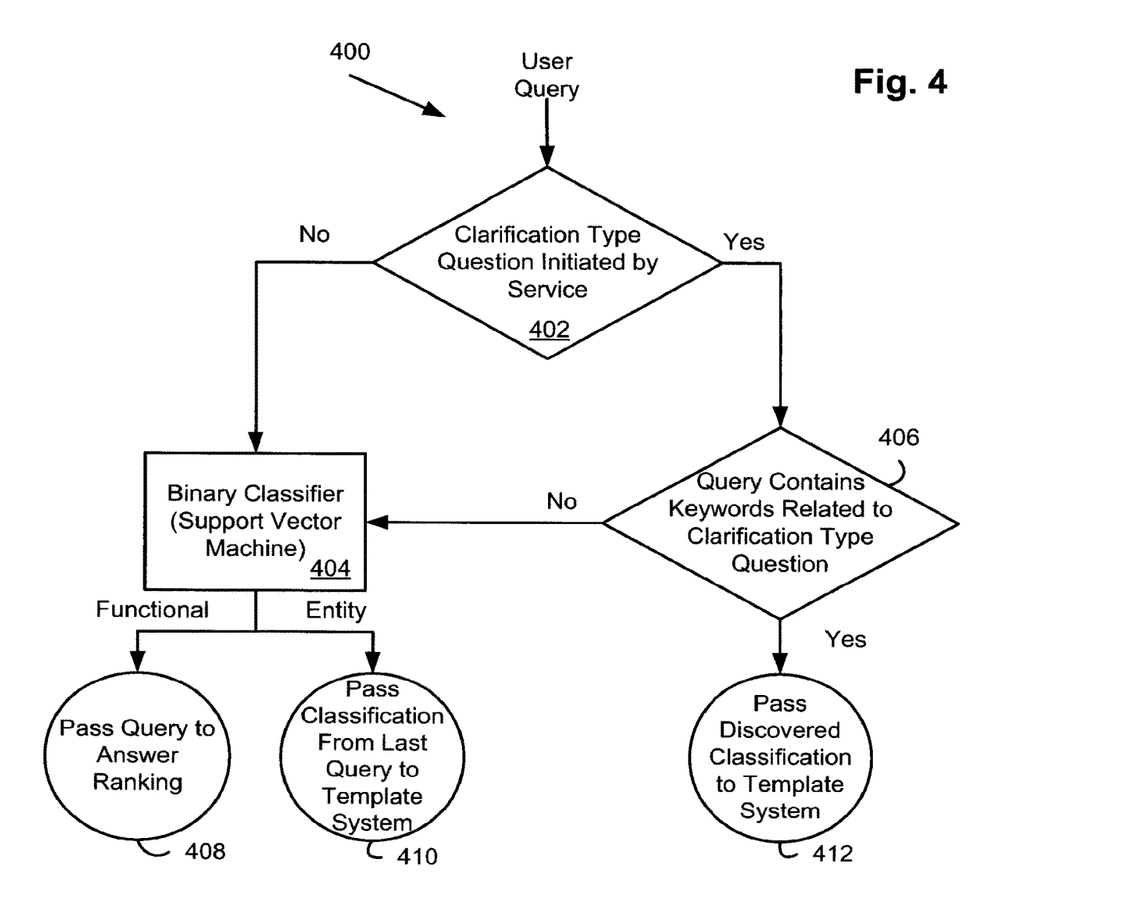
FIG. 4 illustrates a block diagram of modules performing operations (methods) of question type classification.

FIG. 4 illustrates a flow chart of a method 400 of question type classification for question type classification determiner 314 in accordance with an example embodiment. User query 302 is received. At 402, a determination is made whether a clarification type question was initiated (i.e. the question was previously posed (e.g. provided as output 304) to the smartphone via dialogue driver 306). If no, a question is not pending, operations continue at 404. If yes, operations continue at 406.

At step 404, user query 302 is subjected to binary classification such as via a support vector machine (SVM) for analysis. SVM performs analysis of the user query to determine whether the query is an entity type query, related to the current function, or not (i.e. that it is a function type query). Functional type queries are passed (408) to answer ranking unit 316. Entity type queries are passed (410) to template system 318. An SVM is configured using a set of input data or training examples where each is identified as belonging to one of the two query types. A training algorithm builds a model for assigning new queries to one of the two types. An SVM model is a representation of the examples as points in space (hyperplane), mapped so that the examples of the separate categories are divided by a clear gap that is as wide as possible. New queries are then mapped into that same space and predicted to belong to a category based on the side of the gap on which each respective query falls. When preparing the SVM and when passing new queries in for classification, it may be assistive to select provide certain words, terms and metadata or other features related to the query. Using all words from a query may be problematic because common words may skew results incorrectly. Services, application programming interfaces or other means which perform entity extraction may be useful to extract entities such as people, places, dates, specific things, etc. For example, the following is an example of features which may be determined and provided for the SVM:

Presence of Keywords: TF-IDF scores for each domain are calculated for each word in the entire corpus. The words are then sorted and a selection from the words with top 50 highest scores are taken. This is done in the same way as mentioned earlier in the patent.

Question type Keywords: This represents the words that begin questions: how, where, when, why, what followed by obvious keywords that relate to the domains (e.g. commands etc. related to functions provided by a user interface) such as call, email, text, message, book, etc.

Presence of Key Entities: Places/Addresses, Person Names, Restaurant Types, Food Dish Names, Dates, etc. (This list is not complete. As new domains are added, new key entities may be added). These key entities may be retrieved using named entity extraction.

Potential Features: The current action that the user is performing on the device. The previous domain the user requested.

Presence of Regular Expressions: Whether the query matches a pattern known to be found in data for each domain (patterns may have been partly handcrafted and partly learned from data for each domain).

When a clarification question has been posed, at 406, a determination is made whether the user query 302 contains keywords related to the clarification question posed. If yes, then the query is clarification type query and the classification of the user query (and its association with the current command) is passed to template system 318 for further processing. If such keywords are not present, the user query may comprise a new functional type query or an entity type query (such as where the entity/entities were not the focus of the clarification question posed). The user query is forwarded to step 404 via no branch from 406.

Figure 5:
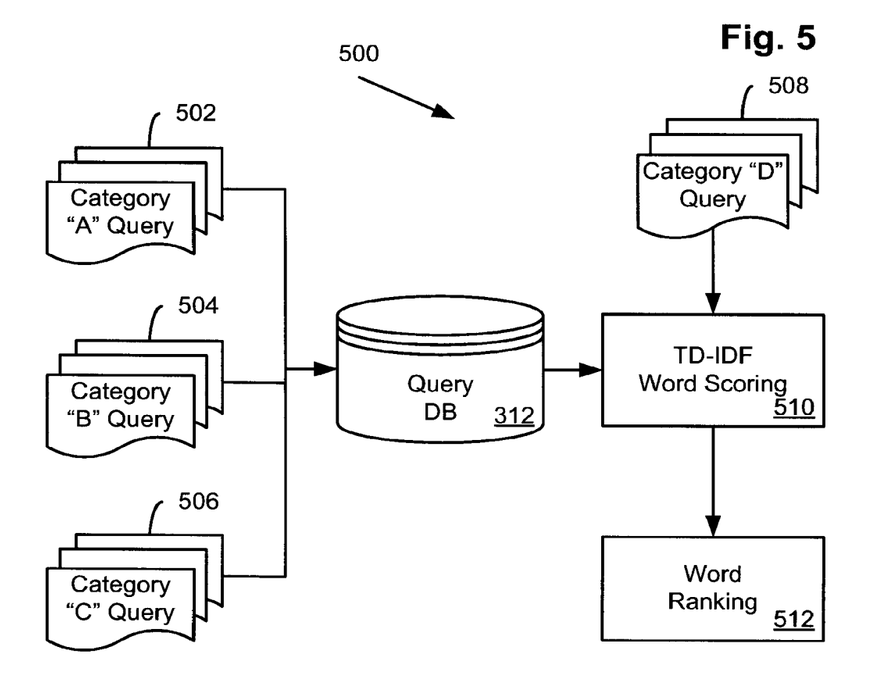
FIG. 5 illustrates a block diagram of modules performing operations (methods) of keyword identification.

Keyword identification may be performed in the context of operations 406 to assist with the determination of whether the user query is an answer to the clarification question posed. Statistics may be defined for particular terms to identify their relative frequency of appearance in user queries associated with a particular category (e.g. each respective categories may represent a specific command). FIG. 5 illustrates a flow chart of a method 500 of keyword identification such as may be useful for processing a user query to determine a set of keywords related to the command and/or entities in the query. A database of queries and associated categories may be defined. For example, in a smartphone communication context relevant to internal services, a subset of categories may represent smartphone functions/commands such as "email", "telephone", "book meeting", "Short Message Service (SMS)/Text" among others. In FIG. 5, the user queries grouped by associated categories are represented generically as Category "A" queries 502, Category "B" queries 504, Category "C" queries 506, and Category "D" queries 508. It is understood that more categories may exist in an actual implementation.

The relative frequency of a term in a category is comparatively determined in relation to the term's infrequency in the other categories as well. As per 510, term frequency-inverse document frequency (TF-IDF) word scoring is used to determine keywords for each category. A document is defined as the set of queries that have the same category (e.g. 508). The corpus (within query database 312) is the set of queries (502, 504 and 506 etc.) that are not the category where we are finding the keywords. A term (keyword) which is relatively unique to category "D" will be less frequently occurring in the corpus of category "A", "B" and "C" queries. This database and associated statistics may be maintained (e.g. pre-calculated) so that the statistics are available for use in real-time when processing the user query. A word ranking for words in the current user query may be determined (at 512) to identify unique words indicative of keyword status.

The user query may be analyzed for keywords from the category or categories associated to the user query. Given that a clarification type question elicited the current user query, one or more categories may be have been previously associated with the current user query as determined from processing the prior user query which occasioned the clarification. These one or more categories relate to the current command. It is understood that because individual user queries may be vague and/or ambiguous, more than one category (command) may be associated with the user query e.g. as respective candidate commands. As the dialogue develops, a specific command can be determined.

The classification of the query type is useful to initiate a new command (via answer ranking unit 316 and template system 318) or to further process a current command (via template system 318).

With reference to FIG. 6 there is illustrated a flow chart of a method 600 of answer ranking. Answer ranking may be performed when a user query is identified as a function type query indicating a new command. Answer ranking may be performed to assist with the identification of the specific command to which the user query relates. In the present example embodiment, answer ranking method 600 performs four types of analyses (602, 604, 606 and 608) of user query 302 and combines the results of same (via two-layer neural network 610) to drive a rank of answers 612. Though a plurality of four natural language processing techniques are used in the example embodiment for this analysis, fewer or additional techniques may be used and the respective results of same combined to drive a rank of answers. In some embodiments, a means other than a two-layer neural network may be used to combine such results.

In one of the analyses, user history is examined to define a previous query score (602). Keywords are extracted from the user query such as by TF-IDF techniques. Previous user queries and their respective associated commands form the corpus for comparative purposes.

Keywords may be expanded with related words (e.g. synonyms) such as via WordNet™ expansion (WordNet is a registered trademark of Princeton University <http://wordnet.princeton.edu>).

The extracted and expanded keywords may form the basis of a comparison or search applied against the query corpus and a relevance score calculated (e.g. retrieval and ranking functions) to rate search results. The search results (i.e. the respective associated command and the ranking score) are made available to operations of two-layer neural network 610.

The ranking function applied at 602 may comprise a BM25 or similar ranking function (e.g. BM25-F taking into account document format, length, etc.). BM25 relies upon IDF statistics to determine relevance of keywords in a document set.

In one of the analyses (random forest 604), the user query is applied to a set of decision trees where each decision tree assigns (determines) a command to which the user query relates. A rank (or mode) may be calculated to determine which command (or commands) results most frequently by the decision trees. Let N(c) represent the number decision trees that classify the user query as command c. R(c) is the score for class c calculated as N(c) divided by the sum of N(c) for all c's derived by the decision trees. The scores and associated candidate commands are made available to operations of two-layer neural network 610. A two layer neural network (see 610 discussed below) may be trained in order to determine the probability that the query was relevant. From this a rank for each of the classes can be determined according to this probability.

In one of the analyses (multiclass Support Vector Machines 606), the query is applied to a set of SVMs to determine a command. In one embodiment, each SVM is a binary classifier configured to determine whether the user query is associated with a particular command or any of the other commands (i.e. a one-versus-all determination). In another embodiment, a SVM is configured for each pair of commands to determine whether the user query is associated with one of two particular commands (e.g. email vs. telephone) (i.e. a one-versus-one determination). It is noted that in a one-versus-one embodiment, SVMs may be configured for a pairing of particular commands to a null class.

In a one-versus-all determination, if the SVM approach is the sole classifier, a winner takes all approach is often adopted, selecting the highest score from the SVMs. The SVMs require calibration to produce comparable scores. In the one-versus-one approach, a command selected most frequently by the set of SVMs is the candidate command if the SVM approach is the sole classifier. In this example embodiment where the SVM approach is one of four inputs, scores for each candidate command are provided for operations of two-layer neural network 610.

In one of the analyses (naïve Bayes classifier 608), the user query is provided to a Bayes-theorem based classifier with strong independence assumptions to perform document classification. The naïve Bayes classifier determines a probability that a particular user query (set of features) belongs (e.g. is associated with) a particular class (i.e. command). The classifier may be trained using a training set of known queries and commands. It is assumed that words of a user query are independent. Frequency of appearance (count) of a word in a given class (command) may be used to determine a probability that a particular word is in a particular class. The score for a particular class is a multiplier of the score (probability) for each word in the query relative to the particular class. Care must be taken when a word never appears in a particular class to avoid multiplying by zero. A smoothing technique can be used to eliminate the effects of zero probabilities in the data.

At two-layer neural network 610, candidate commands and scores from each of the analyses (602, 604, 606 and 608) are available to a two layer neural network to drive a result, tying the four individual predictions (scores) for each class (command) together to define a single score for each command. More particularly, the scores from the classifiers are used as input nodes to a two layer neural network which represents a rank function. The set of classifier scores for a single class represents a single input vector. This vector is scored, via the neural network, according to its relevance to the user query. Here a score of 1 is considered highly relevant to the users query and a score of 0 is considered irrelevant. Each of the vectors for each category are scored via the rank function and sorted according to their score. Finally, the scores are normalized by dividing each of the scores by the maximum of the scores.

Template system 318 thus has available from answer ranking unit 316 data identifying the user query as a function type query and candidate commands and rankings for the new function. Template system may initiate processing to identify a particular command. From question type classification unit 314, template system 318 has data identifying the user query as an entity type or a clarification type. Thus template system may continue previous processing to derive a particular command. Template system 318 may comprise a state machine having states: new function, continue prior dialogue, undo last action/negation (e.g. a command may be to stop or change).

Each command may be associated with a respective template in template memory store 320. Templates may be used to build up a command and its parameters (data). Extraction pipeline 322 may analyze the user query for entities and relationships among entities in the current user query and prior related user queries, working with the template system 318 to populate the template. Anaphora techniques may be used to relate specific words in a user query with entities in a prior user query. For example, user queries "I'd like a ticket from New York" followed by "Change that to San Jose", the word "that" will be associated with both "ticket" and "New York" and New York will be an entity initially defining the from location for the ticket in the template. Extracted template entities are provided back to the template system 318. Control is passed back to the dialogue manager, for example, to produce dialogue.

In one embodiment, Hobbs' algorithm is used to determine the entity(ies) in a previous user query that relate to pronouns in the current user query. Example processing may involve determining whether one or more pronouns is present in the current user query. If one or more pronouns is present in the current user query, then Hobbs' algorithm may be used for each pronoun to determine the words in previous user queries that are referenced by each pronoun. A second user query may be created by substituting the pronoun with the word referenced by the pronoun and named entity recognition may be performed on the second user query.

By way of an exemplary user interaction, say a user previously uttered the user query "Find me a flight from Calgary" and subsequently says "Change that to New York" which is the current user query. The current user query may be analyzed to determine if a pronoun is present; in this example, the pronoun "that" is identified. Next, Hobbs' algorithm may be employed to determine which word(s) in the previous user queries are likely referenced by the pronoun "that". In the exemplary interaction, it is determined that the word "that" likely refers to the city Calgary. In one embodiment, a second user query is created by substituting the pronoun with the word the pronoun likely references which results in a second user query of "Change Calgary to New York". Entity extraction may then be performed on the second user query as described herein in order to perform the command intended by the user.

In one embodiment, once Hobbs' algorithm makes the association between "that" and Calgary, further processing is performed to make the association between "that" and an entity such as departure_city. The user query "Change that to New York" may then be interpreted as meaning change the entity named departure_city to New York which is performed by the system without creating a second user query and performing entity extraction on the second user query. In such an embodiment, the system assigns New York as the new departure_city and sends the new entity to the template system 318.

Figure 7:
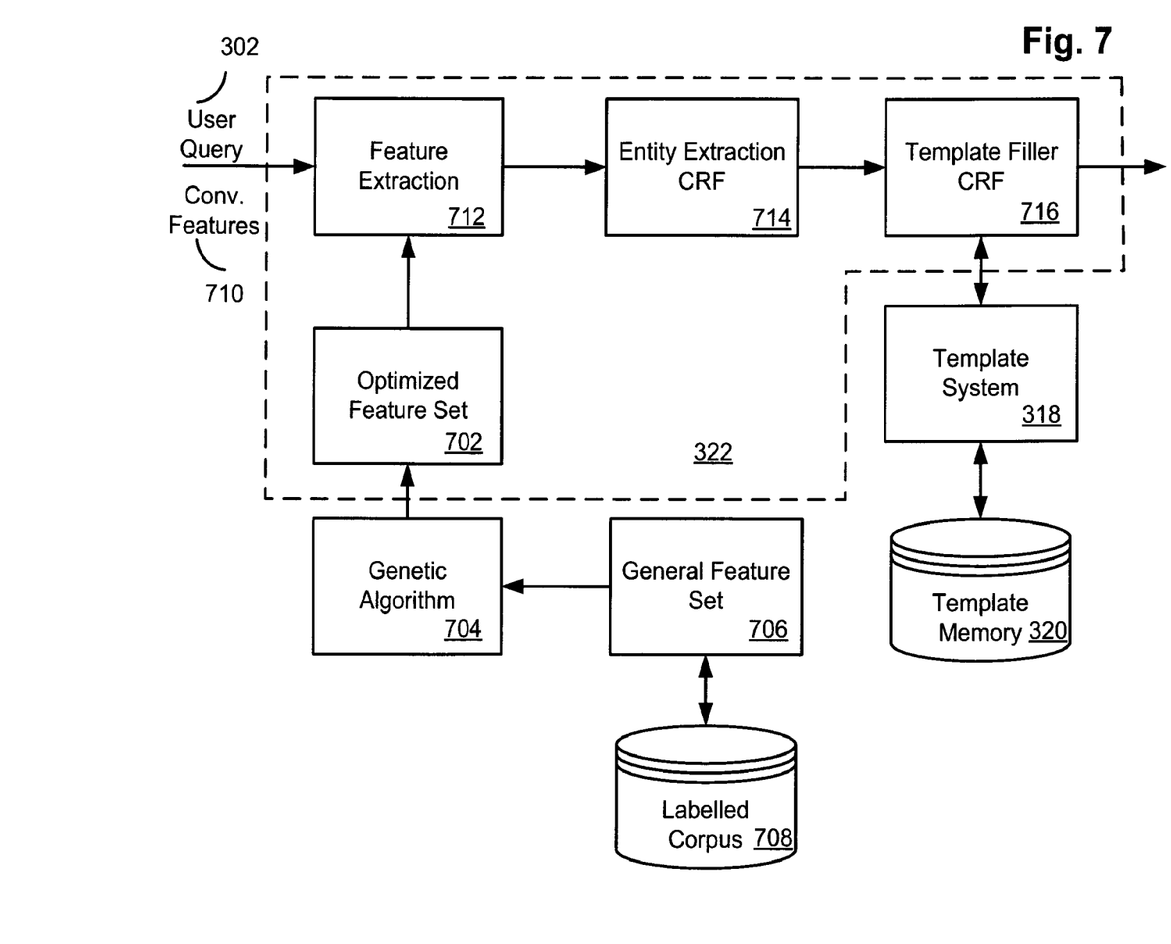
FIG. 7 illustrates a block diagram of modules of an entity extraction pipeline performing operations (methods) of entity extraction.

In more detail and with reference to FIG. 7, a genetic algorithm 704 working on a general feature set 706 determined from a labeled corpus 708 generates (e.g. off-line, in advance of its use in a particular classification instance) optimized feature sets 702 for respective specific classes (e.g. types of functions). Each class may have its own extraction pipeline 322 for extracting entities for the specific class. Each pipeline instance 332 receives the user query 302 and its conversation features 710. Examples of conversational features 710 include question ID, results of pronoun resolution with previous sentences, and other related information.

A feature extraction module 712 expands the features associated with the user query 302 and conversation features 710. Examples include date lists, number lists, city lists, time lists, name lists, among others.

The expanded user query and its specific conversation features are fed through the filter created by the genetic algorithm and provided to a previously defined conditional random field (CRF) or another sequential classifier. CRF is a statistical modeling method applied for pattern recognition. Optimized feature sets are used to define the filter and to train the CRF. The CRF is trained with specific features decided by the genetic algorithm. To train a CRF, it is required to obtain training data, which includes a set of labeled test queries relating to a particular domain. Labeling a set of training data may include labeling entities found in the test queries (such as departure_city) by marking up the text queries using a predefined mark-up language or format. After it is trained with specific features it will expect those features in the future. The system ensures that the CRF only gets the features it is expecting.

In the illustrated embodiment, two layers of CRF are employed. A first layer determines general entities (e.g. an entity extraction CRF 714). For example, in a travel booking user interface, general entities may include date, place, time. A second layer determines more specific template entities (e.g. an template filler extraction CRF 716) such as destination, departure location, departure date to fill templates of the template system 318. In some embodiments, a single CRF layer may be employed. Template system 318 may store (e.g. to template memory store 320) the filled or partially filled template for a particular command as user queries are processed. In embodiments in which two layers of CRF are employed, the first CRF may be used to determine general entities as described above, and these entities may be used as features in the second CRF which then determines more specific entities.

A genetic algorithm assists to make the extraction pipeline adaptable to new domains, defining new optimized feature sets as directed.

Dialogue driver 306 maintains conversation/system state and generates responses (output 304) based on the state of the conversation. Dialogue driver 306 may be configured as a finite state machine. Markov decision process (MDP) or partially observable MDP (POMDP) techniques may be used for determining actions of the dialogue driver 306. States may comprise entity, clarification, speech error, NLP error, unknown request, informative response.

Clarification type questions may be generated. Each class has a predefined descriptive. Dialogue driver 306 generates a question providing specific alternatives among the classes e.g. Did you want to <class 1>, <class 2>, <class 3>? For a user query "Tell Bob I want a meeting Thursday", a question in response is "Did you want to text, email or book a meeting? Dialogue driver passes the desired command and extracted entities to the delegate service 108 for example, to invoke a particular function.

Figure 8:
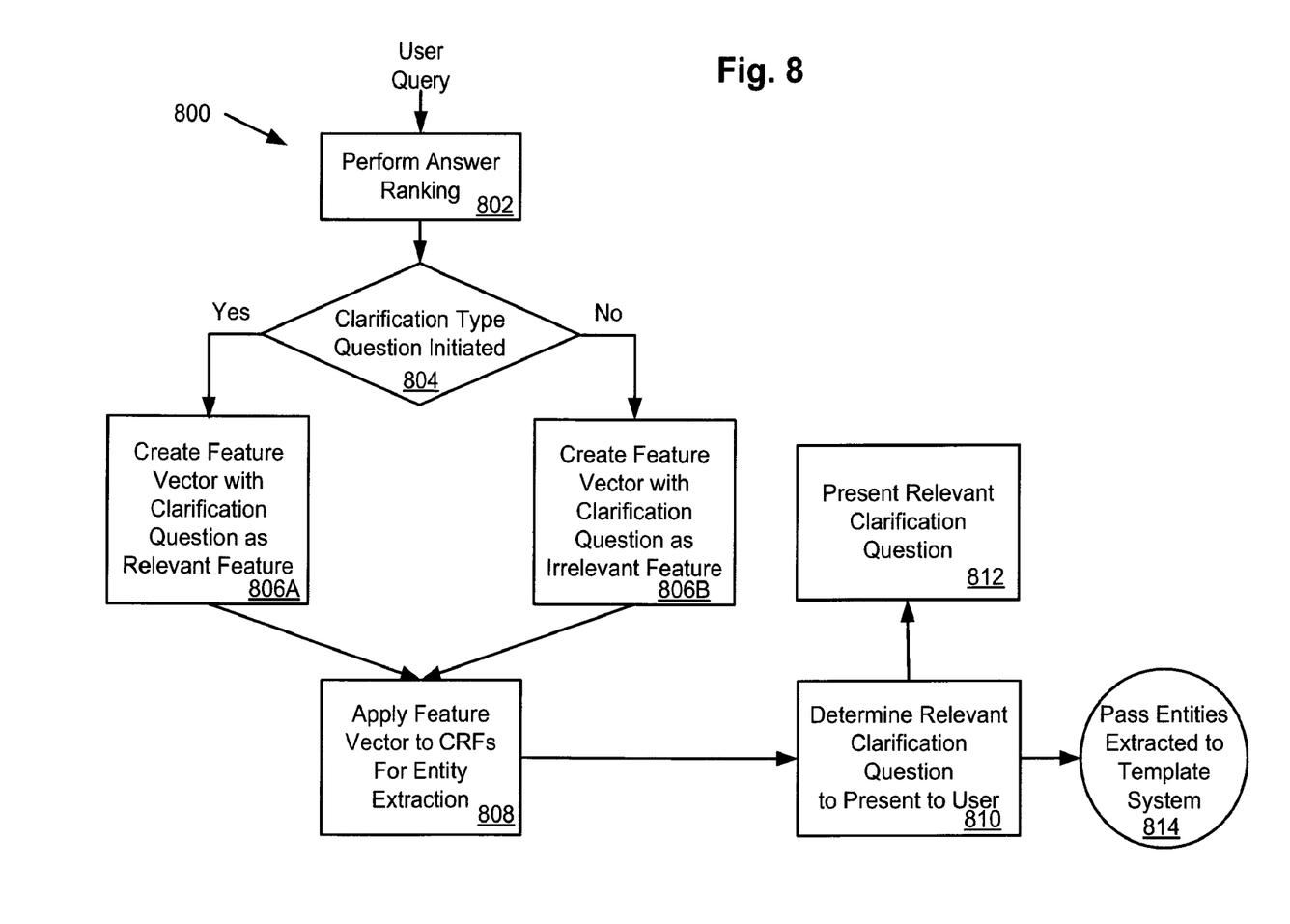
FIG. 8 illustrates a general overview flow of selected operations of capturing clarification questions/dialog within feature sets according to one example embodiment.

FIG. 8 illustrates a general overview flow of selected operations (methods) 800 of capturing clarification questions/dialog within feature sets according to one example embodiment. The operations 800 may be used to increase the accuracy of the service of FIGS. 1 and 2 by incorporating clarification questions and/or user queries responsive to clarification questions into a feature set used to extract entities.

In some embodiments, a feature set is created for each general domain of knowledge. For example, the calendar domain may have a feature set, the news domain may have a feature set, the knowledge domain may have a feature set, and so forth. Each feature set may be created and fine-tuned using one of several techniques, for example, by using one or more genetic algorithms, examples of which are described herein. A given feature set may include one or more elements that represent whether a clarification question was initiated by the system and/or whether a given user query was responsive to a clarification question posed. A particular feature may be present in a feature set for each clarification question/dialog statement that may be initiated by the system and presented to the user. For example, if a database of the system contains 1000 possible clarification questions, then 1000 features in the feature set will be present, each of which is associated with a particular clarification question. When a particular clarification question is posed, then the feature associated with the particular clarification question may be set to '1' and all other features related to the other clarification questions (i.e. the clarification questions not posed to the user) may be assigned a '0' or NULL value.

In one embodiment, the system includes a plurality of possible clarification questions that may be initiated and presented to the user on smartphone 102 in order to elicit entity information from the user. The particular clarification question posed to a user depends at least in part on the entities that have not been provided by the user's query 302 or extracted by the system. In one approach, the system maintains a linear mapping between all possible filled or unfilled entity states, and predefined questions related to each entity state. In an exemplary interaction, a user utters the user query of "Get me a flight to Calgary leaving on Friday". The system may classify the sentence in accordance with FIG. 4-6 and extract entities ("Calgary" and "Friday") according to FIG. 7. The system may further determine that a departure city is required in order to perform the command desired by the user. Several techniques may be used to determine the departure city. In some embodiments, the system may use a default rule that automatically selects the closest city with an airport. In other embodiments, the system initiates a clarification question to elicit the departure city from the user, for example "Which city would you like to leave from?" In another exemplary interaction, the user utters the user query "Get me a flight from Toronto to Calgary". In one embodiment, the system may process the user query 302 in accordance with FIGS. 3-7 and determine that a departure date and possibly a return date is required in order to execute the desired command (i.e. find a flight). Continuing with the example, the system may present a clarification question to the user on smartphone 102 to elicit the departure date such as "What day would you like to leave?"

Referring to FIG. 8, a user query 302 is received and the output of operations 800 is provided to the template system as described herein. At 802, answer ranking is performed on the user query to identify the command desired by the user. A determination is made at step 804 whether a clarification type question was recently initiated by the service and presented to the smartphone via dialogue driver 306. If a clarification question was recently initiated, then at 806A, a feature vector is created that represents the user query 302 and other relevant information. Other relevant information may include the clarification question that was initiated by the system. Given that that the system may include a repository of clarification questions in a database, each of which are designed to elicit specific entity information in relation to a particular command, the feature vector created for a given user query will generally only indicate the particular clarification question that was initiated (although multiple clarifications may be concatenated into a single dialog statement in other embodiments and the multiple clarification questions will be captured in the feature set). The other clarification questions (i.e. the clarification questions that were not initiated by the system) will be represented in the feature vector as not being relevant. If a clarification question was not initiated by the system recently, the feature vector created at step 806B will not indicate any clarification questions as being relevant to the user query 302 (i.e. the features representing clarification questions may be set to 0 or Null). At 808, the feature vector created at step 806A or 806B is then applied to one or more conditional random fields to extract the entities that relate to the identified command. At step 810, a determination is made about which clarification questions/dialog will be displayed to the user. This determination may involve cross-referencing the entities already filled in by template system 318 with the entities required by a particular command. In some embodiments, if all the entities have been elicited and/or assumed by the system, a clarification question may be presented confirming the command that is about to be performed. The command is performed if the user confirms the instructions.

If all the entities required by command have been identified then the flow of operations is transferred to the template system 318 at step 814 so that the command may be performed. A clarification question may also be presented at 812 to confirm the request. If all of the entities for a particular command are not known, however, then the system will identify the proper clarification question to present to the user to elicit the unknown entities and will present the selected clarification question to the user at step 812.

In some embodiments, a clarification question and/or dialog is presented to the user after every user query 302 is received. In such implementations, the dialog is selected at 810 and presented to the user at 812. Any new entities that have been extracted at 808 are also provided to the template system at 814.

Figure 9:
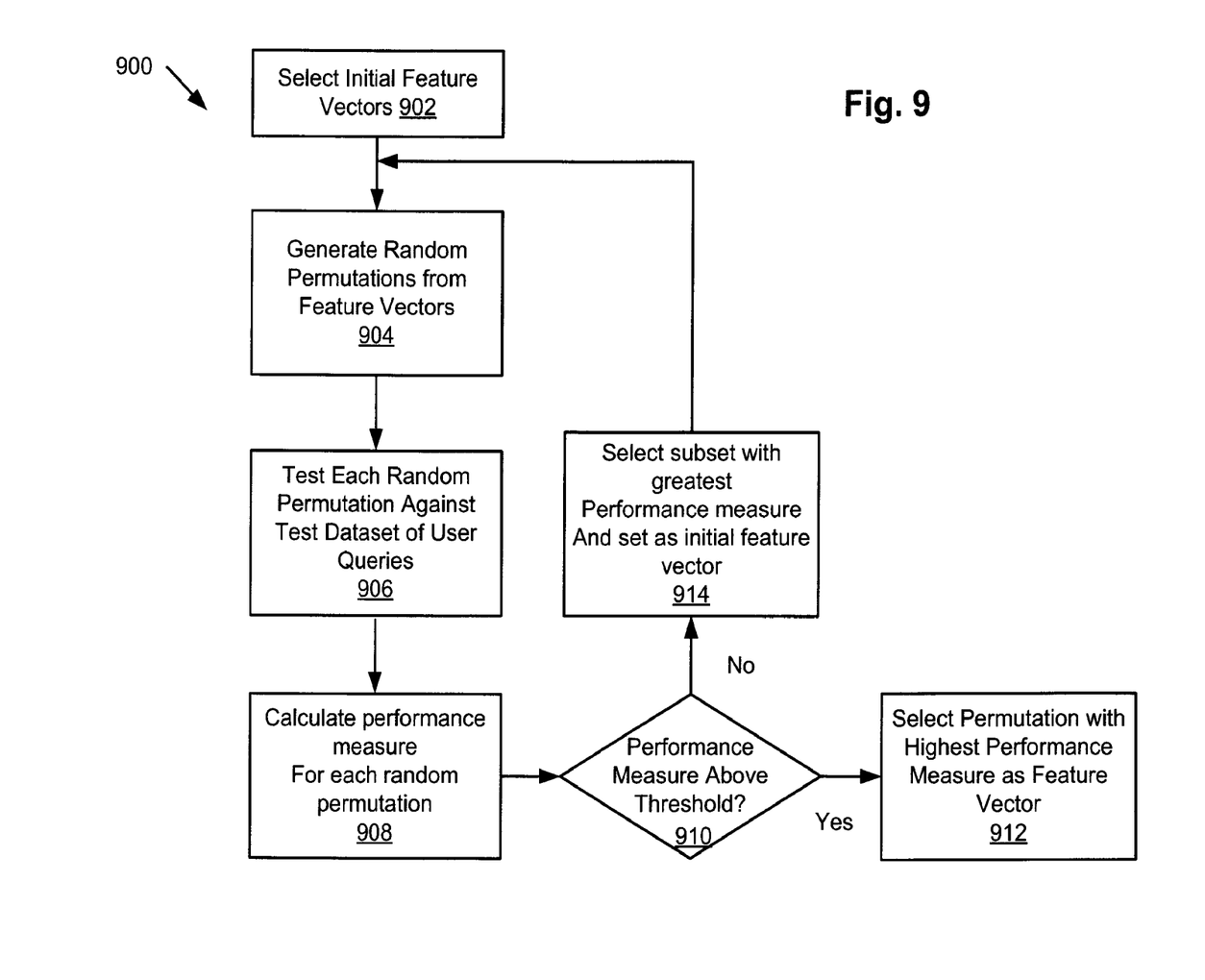
FIG. 9 illustrates a general overview flow of selected operations for defining optimal feature sets (i.e. feature vector(s)) using a genetic algorithm according to one embodiment.

Referring next to FIG. 9, a general overview flow of selected operations (methods) 900 is illustrated for defining optimal feature sets (i.e. feature vector(s)) using a genetic algorithm according to one embodiment. At step 902, one or more initial features sets are defined as the starting point in the genetic algorithm. The initial feature set(s) may be generated randomly or may be selected by an expert at least partly based on the subject matter of the domain to which the feature set is directed (for example, weather). At step 904, a set of random permutations of the initial feature set(s) is generated. The number of random permutations generated is up to an administrator, but may also be preset depending on the number of features available in a given feature set. For example, if a given feature set has hundreds of thousands of features available then it may be desirable to run the genetic algorithm with thousands of random permutations being generated at step 904.

At step 906, each of the random permutations of feature sets will be tested against a test dataset that contains test user queries. To perform the testing of 906, each user query in the test dataset will be applied to the each random permutation in order to evaluate the performance (i.e. accuracy, speed, etc.) of each random permutation feature set. At 908, a performance measure is calculated for each random permutation. In some embodiments, the performance measure is calculated using a function that includes an "f-measure+log (n)" relationship so that random permutations having a combination of accuracy and speed are favored by the system, although other performance measures may be used at step 908.

Step 910 is an optional step in which the performance measure of each random permutation is compared against a predetermined threshold. If one or more of the random permutations has a performance measure greater than the predetermined threshold, than the random permutation with the most favorable performance measure may be selected as the genetic algorithm is being applied. If none of the random permutations have a performance measure that is greater than a predetermined threshold then a subset of the random permutations with the most favorable performance thresholds (or all of the random permutations) may be set as the initial feature sets at 914 and the genetic algorithm may be run again beginning at step 902.

The flow of operations shown in FIG. 9 is one round of genetic selection. In some embodiments, the operations of FIG. 9 may be run several times to increase the performance of the final feature set selected at step 912.

In one embodiment, the process of FIG. 9 begins by an administrator selecting the initial feature vector as well as tuning parameters X and Y. X refers to the number of permutations that are to be generated at 904 and Y refers to the number of times the genetic algorithm is run (i.e. the number of rounds of genetic selection to be performed). For example, an administrator may set X=1000 and Y=10,000, meaning that 1000 random permutation will be generated from the initial feature vector(s) and the genetic algorithm will be run 10,000 times. In such an embodiment, decision step 910 is not executed, but rather, the algorithm is run 10,000 times whether or not a performance measure is calculated.

The scope of the claims should not be limited by the specific embodiments set forth in the examples, but should be given the broadest interpretation consistent with the description as a whole.

We claim:

1. A computer-implemented method of processing input queries for performing one or more commands, the method comprising:
    receiving, by a communication system, a first query, wherein the first query includes a command requiring one or more parameters for performance;
    determining a query type of the first query based on the command, wherein the query type is selected from a group comprising a functional query type, an entity query type, and clarification question type;
    processing, in response to determining that the first query is the functional query type, the first query to determine a type of function for at least one command of the first query by ranking candidate types of functions for the at least one command;
    identifying a template based on the type of function for the at least one command, wherein the template comprises the at least one command and at least one placeholder for an entity associated with performing the at least one command;
    after receiving the first query and before performing the command, receiving a second query including an entity and anaphora;
    in response to determining that a third query is received in response to a request for clarification:
        classifying the third query as a clarification question type for the command;
        creating a feature vector indicating a relevance of the second query and the third query to the first query;
        based on the feature vector and the determination, processing the second query and the third query to associate the entity with the parameter required for performing the command of the first query;
    in response to determining that the third query is not received in response to a first clarification question:
        determining whether a query type of the third query is a functional query type or an entity query type;
        determining, in response to determining that the third query is the function query type, a subsequent command by performing a plurality of natural language processing techniques to determine a rank of candidate commands and selecting the subsequent command in response;
        performing the subsequent command and the command with the entity in place of the at least one placeholder in view of the subsequent command; and
    providing one or more results of the performed commands.

2. The computer-implemented method of claim 1, further comprising:
    in response to the first clarification question, receiving the third query;
    performing keyword analysis on the third query to determine whether the third query is responsive to the first clarification question; and
    in response to the keyword analysis, classifying the third query as a clarification query for the command.

3. The computer-implemented method of claim 2, wherein the keyword analysis is performed in accordance with term frequency-inverse document frequency (TF-IDF) techniques on keywords in the third query that are associated with the first clarification question.

4. The computer-implemented method of claim 2, further comprising:
    in response to a second clarification question, receiving a fourth query, wherein the fourth query is unresponsive to the second clarification question; and
    determining whether the fourth query is one of an entity query or a functional query.

5. The computer-implemented method of claim 4, wherein determining the subsequent command by performing the plurality of natural language processing techniques to determine the rank of candidate commands and selecting the subsequent command in response comprises when the fourth query is the functional query, analyzing the fourth query to determine the subsequent command by performing the plurality of natural language processing techniques to determine the rank of candidate commands and selecting the subsequent command in response.

6. The computer-implemented method of claim 5, wherein the natural language processing techniques include one or more of random forest processing, naive Bayes classifier processing, a plurality of support vector machines processing, and previous query score processing.

7. The computer-implemented method of claim 5, wherein the rank is derived from the plurality of natural language processing techniques via a two layer neural network responsive to an output of each of the plurality of natural language processing techniques.

8. The computer-implemented method of claim 6, further comprising maintaining a data store of prior user queries and respective commands.

9. The computer-implemented method of claim 8, wherein the prior user queries are responsive to clarification questions posed to individual users to provide user-centric preferences for commands.

10. The computer-implemented method of claim 1, further comprising posing a clarification question in response to a previous user query, the clarification question associated with the type of the function.

11. The computer-implemented method of claim 10, wherein a feature set is used to extract entities for particular types of functions associated with the command, and
    wherein the feature set comprises a feature associated with the clarification question posed.

12. The computer-implemented method of claim 1, further comprising:
    using a genetic algorithm to define optimized feature sets with which to extract entities for particular types of functions.

13. The computer-implemented method of claim 12, wherein defining optimized feature sets comprises:
    performing at least one round of genetic selection to identify the optimized feature sets, wherein one round of genetic selection comprises:
        identifying at least one initial feature set;
        generating a plurality of random permutations from the at least one initial feature set;
        testing the plurality of random permutations using a dataset of test queries;
        determining a performance measure for each of the plurality of random permutations; and selecting a subset of the plurality of random permutations at least in part based on the performance measure of each respective random permutation.

14. The computer-implemented method of claim 13, wherein the performance measure comprises an accuracy measure and a computational efficiency measure.

15. The computer-implemented method of claim 14, further comprising:
performing additional rounds of genetic selection after the first round of genetic selection has been performed, each additional round of genetic selection including the step of setting the subset of the plurality of random permutations as the at least one initial feature set.

16. The computer-implemented method of claim 1, wherein the first query and the second query comprise voice signals, the method further comprising:
converting the voice signals to text.

17. A computing device comprising:
at least one processor; and
at least one memory storing computer-executable instructions that when executed by the at least one processor cause the computing device to perform operations, comprising:
receive a first query, wherein the first query includes a command requiring one or more parameters for performance;
determine query type of the first query based on the command, wherein the query type is selected from a group comprising a functional query type, an entity query type, and clarification question type;
process, in response to the determination that the first query is the functional query type, the first query to determine a type of function for at least one command of the first query by ranking candidate types of functions for the at least one command;
identify a template based on the type of function for the at least one command, wherein the template comprises the at least one command and at least one placeholder for an entity associated with performing the at least one command;
after receiving the first query and before performing the command, receive a second query including an entity and anaphora;
in response to determination that a third query is received in response to a request for clarification:
classify the third query as a clarification question type for the command;
create a feature vector indicating a relevance of the second query and the third query to the first query;
based on the feature vector, the determination, process the second query and the third query to associate the entity with the parameter required for performing the command of the first query;
in response to determination that the third query is not received in response to a first clarification question:
determine whether a query type of the third query is a functional query type or an entity query type;
determine, in response to the determination that the third query is the function query type, a subsequent command by performing a plurality of natural language processing techniques to determine a rank of candidate commands and selecting the subsequent command in response;
perform the subsequent command and the command with the entity in place of the at least one placeholder in view of the subsequent command; and
provide one or more results of the performed commands.

18. A tangible computer storage medium storing computer-executable instructions that when executed by at least one processor cause a computing device to perform operations, comprising:
receive, by the computing device, a first query, wherein the first query includes a command requiring one or more parameters for performance;
determine a query type of the first query based on the command, wherein the query type is selected from a group comprising a functional query type, an entity query type, and clarification question type;
process, in response to the determination that the first query is the functional query type, the first query to determine a type of function for at least one command of the first query by ranking candidate types of functions for the at least one command;
identify a template based on the type of function for the at least one command, wherein the template comprises the at least one command and at least one placeholder for an entity associated with performing the at least one command;
after receiving the first query and before performing the command, receive a second query including an entity and anaphora;
in response to determination that a third query is received in response to a request for clarification:
classify the third query as a clarification question type for the command;
create a feature vector indicating a relevance of the second query and the third query to the first query;
based on the feature vector and the determination, process the second query and the third query to associate the entity with the parameter required for performing the command of the first query;
in response to determination that the third query is not received in response to a first clarification question:
determine whether a query type of the third query is a functional query type or an entity query type;
determine, in response to the determination that the third query is the function query type, a subsequent command by performing a plurality of natural language processing techniques to determine a rank of candidate commands and selecting the subsequent command in response;
perform the subsequent command and the command with the entity in place of the at least one placeholder in view of the subsequent command; and
provide one or more results of the performed commands.

* * * * *